Oct. 4, 1949.           S. R. KELLER           2,483,773
                     INTERNAL GRINDING TOOL
Filed Aug. 27, 1947                         2 Sheets-Sheet 1
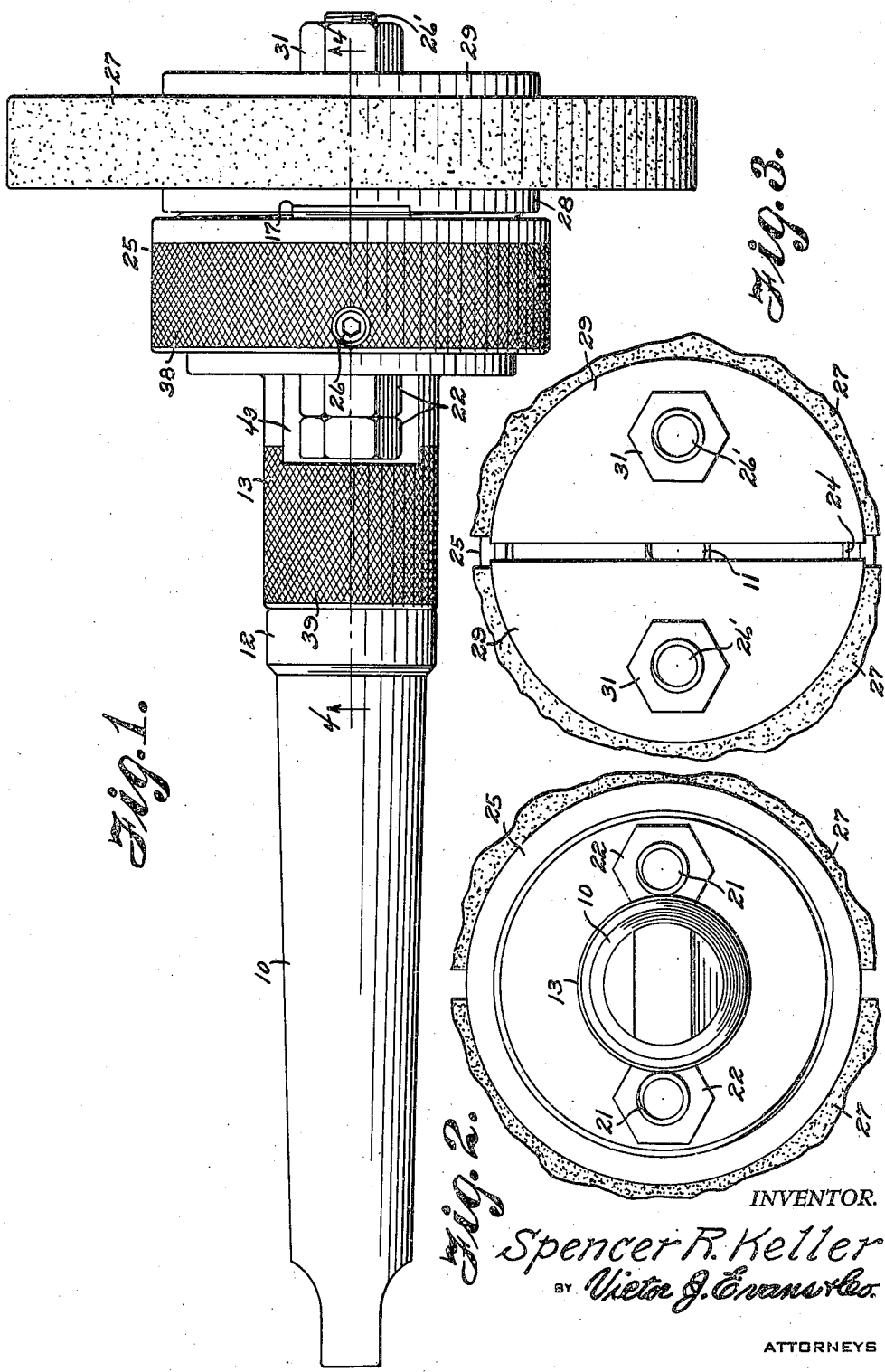
INVENTOR.
Spencer R. Keller
BY Victor J. Evans & Co.
ATTORNEYS Oct. 4, 1949.　　　　S. R. KELLER　　　　2,483,773
INTERNAL GRINDING TOOL
Filed Aug. 27, 1947　　　　　　　　　　　　2 Sheets-Sheet 2
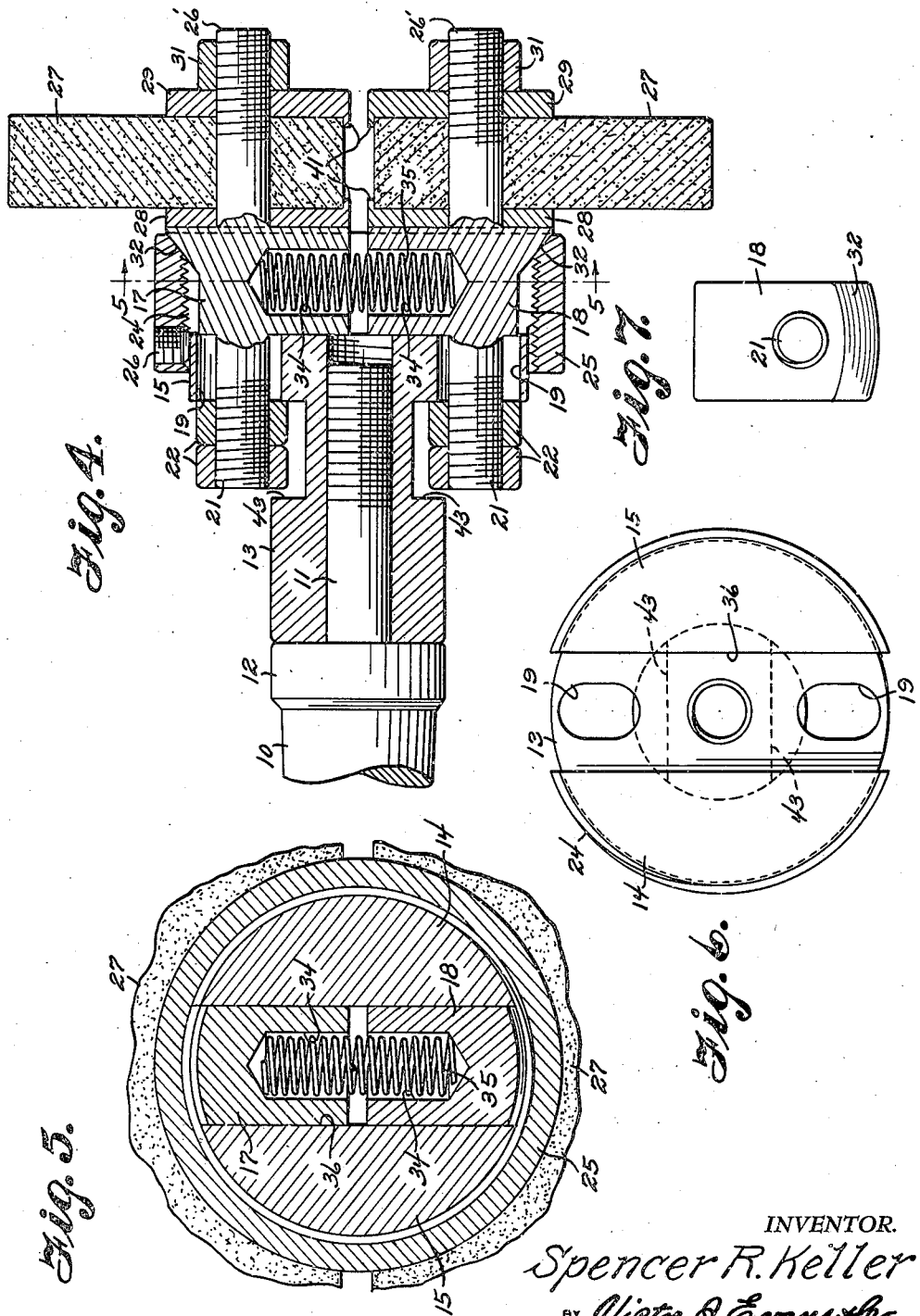
INVENTOR.
Spencer R. Keller
BY Victor J. Evans & Co.
ATTORNEYS Patented Oct. 4, 1949

2,483,773

UNITED STATES PATENT OFFICE 2,483,773

INTERNAL GRINDING TOOL

Spencer R. Keller, Handley, W. Va.

Application August 27, 1947, Serial No. 770,881

1 Claim. (Cl. 51—184.2)

This invention relates to internal grinding tools.

It is an object of the present invention to provide an internal grinding tool having separable stone grinding elements which can be adjusted to different positions for grinding openings of different diameters wherein means are provided for keeping the elements separated when the adjusting element is in position to allow the expansion of the stone elements.

It is another object of the present invention to provide an adjustable internal grinding tool which has simple means for effecting the adjustment of the grinding stone elements, which is of simple construction, has a small number of parts, inexpensive to manufacture and efficient in operation.

For other objects and for a better understanding of the invention, reference may be had to the following detailed description taken in connection with the accompanying drawing, in which Fig. 1 is a side elevational view of the grinding tool embodying the features of the present invention.

Fig. 2 is a fragmentary end elevational view of the tool looking at the spindle end of the same.

Fig. 3 is an end elevational view of the tool looking upon the clamping plates for retaining the stone elements in place.

Fig. 4 is a longitudinal cross-sectional view taken generally on line 4—4 of Fig. 1.

Fig. 5 is a transverse cross-sectional view taken on line 5—5 of Fig. 4.

Fig. 6 is an elevational view looking upon the spindle part with the other parts removed from the same.

Fig. 7 is an end elevational view of the stone element carrying parts.

Referring now to the figures, 10 represents a spindle member having a threaded projection 11 thereon and a shoulder 12 against which a sleeve 13 is fitted. The sleeve 13 has forwardly extending side portions 14 and 15 between which stone element carrying members 17 and 18 are extended. The sleeve member also has elongated slots diametrically disposed from one another as indicated at 19 into which are extended threaded projections 21 of the stone element carrying members 17 and 18. These members while extending into the elongated slots 19, are guided between the portions 14 and 15. These members 17 and 18 are retained against axial displacement in the slots 19 respectively by pairs of lock nuts 22. Inasmuch as the slots 19 are elongated the members 17 can move inwardly or outwardly to the desired positions. Upon the sleeve 13 there is provided threads 24 over which an adjusting ring 25 can be extended and locked by a set screw 26. The members 17 and 18 respectively have forwardly extending projections 26 on which stone elements 27 are respectively supported. These stone elements are of half circular shape and are disposed between clamping plates 28 and 29 and retained on the projections by a nut 31. The members 17 and 18 have inclined edges 32 upon which the forward end of adjusting ring 25 is extended. If the adjusting ring is extended forwardly, the stone elements will be moved inwardly to operate upon a narrow diameter opening. If the adjusting ring 25 is moved rearwardly, the members 17 and 18 can be separated to a great extent so that the stone elements can work on a larger diameter opening. The elements 17 and 18 have respectively holes 34 for receiving a compression spring 35 serving to maintain the members 17 and 18 against the end of the adjusting sleeve 25. The members 17 and 18 will be guided in their outward movement by the inner side faces as indicated at 36 on the extensions 14 and 15 of the sleeve 13.

The adjusting ring 25 is knurled as indicated at 38 in Fig. 1. Sleeve 13 is also knurled as indicated at 39.

The clamping plates 28 and 29 have lips on their bottom edges as indicated at 41 so as to lock the plates with the stone element to prevent relative rotation therebetween. Recesses or flattened portions 43 are provided on the sleeve 13 to accommodate the lock nuts 22.

While various changes may be made in the detail construction, it shall be understood that such changes shall be within the spirit and scope of the present invention as defined by the appended claim.

I claim:

An adjustable grinding tool for grinding internal openings comprising a spindle having a central threaded projection thereon and an annular shoulder at the rear of the projection on the spindle, a sleeve on the projection abutting the shoulder end having longitudinally extending elongated openings, stone element carrying members having threaded projections extending into the opening and adapted to be adjusted radially with respect thereto, and means for securing the projections within the openings against axial displacement therefrom, and said sleeve is provided with recesses for the accommodation of said means, oppositely extending threaded projections on said stone element carrying members stone elements connected respectively to the oppositely extending projections on the stone element carrying members, an adjusting ring on the exterior of the sleeve and adjustable axially thereover, said stone element carrying members having respectively inclined edges adapted to cooperate with the outer end of the adjusting ring to limit their outward movement, said sleeve having guide projections extending respectively at opposite sides of the stone element carrying members, said stone element carrying members having opposing openings, and spring means disposed in the openings whereby to keep the members extended outwardly.

SPENCER R. KELLER.

REFERENCES CITED

The following references are of record in the file of this patent:

UNITED STATES PATENTS

| Number | Name | Date |
|---|---|---|
| 1,523,649 | Karstens | Jan. 20, 1925 |
| 1,722,301 | Kavle | July 30, 1929 |